Dec. 8, 1936. R. LE R. SHEETZ 2,063,060
LIFTING BRACKET FOR AUTOMOBILE JACKS
Filed Feb. 28, 1935
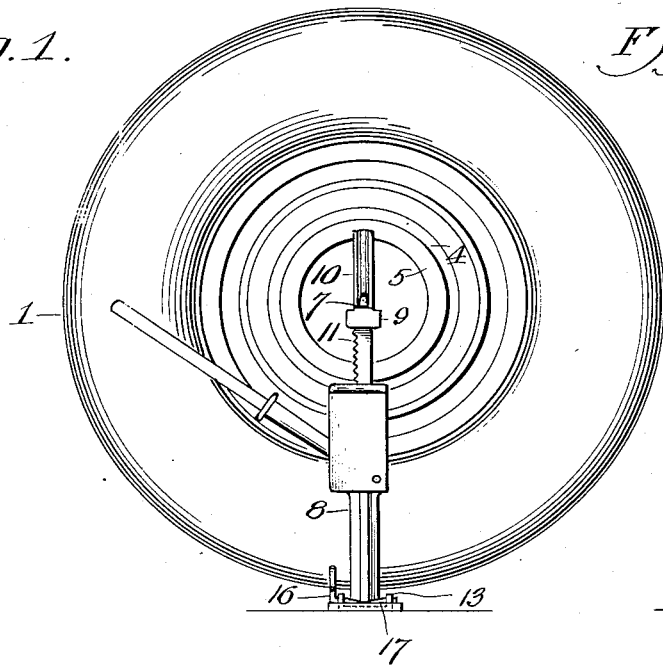
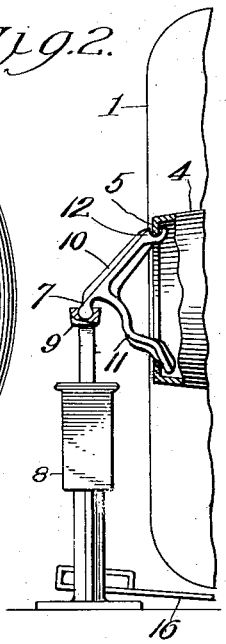
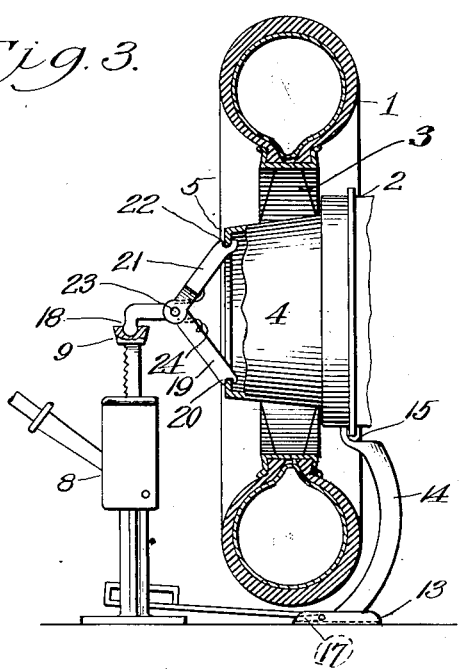
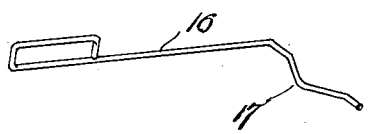
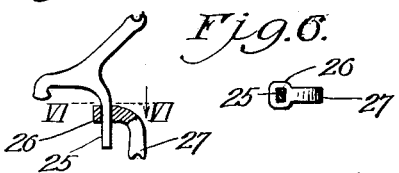
Inventor,
Robert Leroy Sheetz.
By Thorpe & Thorpe
Attorneys Patented Dec. 8, 1936

2,063,060

UNITED STATES PATENT OFFICE 2,063,060

LIFTING BRACKET FOR AUTOMOBILE JACKS

Robert Le Roy Sheetz, Independence, Mo., assignor to Master Appliances, Incorporated, a Corporation of Missouri Application February 28, 1935, Serial No. 8,691

5 Claims. (Cl. 254—133)

This invention relates to lifting brackets for cooperative action with automobile jacks in wheel or tire changing operations. Since the advent of independent wheel springing, usually referred to as knee-action, and the development of constructions concealing or shielding the running gear of automobiles as incident to stream-lining, the problem of tire or wheel changing has become more and more difficult, as it is troublesome, with the ordinary long-handled car jack, to manipulate the jack from one end of an automobile.

The prime object of the invention, therefore, is to provide devices making it possible to perform all of the tire or wheel changing operations from the side of the car, obviating entirely the necessity of working from one end of the car.

Another object of the invention is to produce a vehicle stand which, after a wheel has been raised from the ground, may be placed in position for receiving the lower edge of the brake drum to carry the weight of the car during the wheel or tire removing and replacing operations.

A further object of the invention is to produce a lifting bracket of the general character set forth which is adjustable to fit practically all size wheels in common use.

A still further object of the invention is to produce devices of the general character set forth which are of strong, durable, efficient and inexpensive construction; and in order that they may be fully understood, reference is to be had to the accompanying drawing, in which:—

Figure 1 is a front view of a lifting bracket embodying the invention, as it will appear in cooperative relation to a wheel and lifting jack.

Figure 2 is a side view, partly in section, of the construction shown in Figure 1.

Figure 3 is a view similar to that of Figure 2, of an adjustable lifting bracket in cooperative relation to a lifting jack and wheel, and also illustrates the auxiliary stand for supporting the car through contact with the brake drum.

Figure 4 is a detail perspective view of one form of handle for placing and removing the vehicle stand of Figure 3.

Figure 5 indicates a side view of a modified form of adjustable lifting bracket.

Figure 6 is a section on the line VI—VI of Figure 5.

In the said drawing, where like reference characters identify corresponding parts in all of the figures, it is to be noted that the invention is shown as applied to a demountable wheel, although it will be understood that it could cooperate with the felloe of an artillery wheel, if desired, I represents a wheel which is demountably carried by a brake drum 2. In the type of wheel illustrated, the spokes 3 are secured to the hub housing or casing 4 around the end of the axle, not shown, and the rim of the wheel as customary. The end of the casing 4 is usually open and is flanged as at 5 for detachable engagement with a cover plate (not shown). To remove the wheel, the cover plate must be taken off, and then a tool is inserted into the casing 4 for loosening the wheel-carrying bolts (not shown).

One form of lifting bracket, embodying the invention, comprises a foot or bearing portion 7 which may be of any suitable shape for resting on the head of a lifting jack 8. By preference, the head 9 of the jack 8, and the bracket bearing-portion are made so that they may be detachably interlocked as illustrated, in order to guard against the possibility of the bracket slipping from position on top of the jack.

Extending from the foot portion 7 of the bracket are a pair of arms 10 and 11, which may be of any desired length in accordance with the distance to be spanned, the upper arm 10 terminating in a notched seat portion 12 shaped to receive the flange 5, or the felloe of the wheel, if desired. The other arm 11 extends downwardly within the casing 4, and by contact with the flange 5, resists the tendency of the seat 12 to fulcrum as lifting pressure is applied on the foot 7 by the lifting jack 8. In placing the bracket in position, its arm 11 is projected into the casing 4 a sufficient distance to permit the arm 10 through its seat 12, to properly cooperate with the upper part of flange 5 of the wheel hub 4. The device will be manually held in position until the jack has been extended into contact with the foot 7, when the pressure of the jack will hold it from falling out of the wheel.

In the operation of the device, the bracket is engaged as described and the wheel is then lifted by operation of the jack, until the brake drum 2 has been elevated a sufficient distance above the ground to permit the operator to place a vehicle stand under said drum (see Figure 3): The stand comprises a base portion 13 on which is integrally mounted by preference, a curved upright 14 to accommodate the varying curvatures of tires. The upper end of the stand terminates in a seat portion 15 of proper contour to receive and support the brake drum of a car. In this connection it is to be noted that the base 13 and the seat 15 bear such a relation to each other that the load is centered over the base in such a manner that the stand has no tendency to tip over, although this construction is not essential. To maneuver the stand into position, it is provided with a handle 16 pivoted to the base, the handle when in operative or unfolded position, as shown, extending in a plane parallel to but in the opposite direction from the curvature or offset portion of the upright, so that the stand may be manipulated from outside the wheel to place it in proper position under the brake drum of a car. The handle illustrated is provided with a crank portion 17 which prevents the stand from pivoting around the handle in one direction.

After the auxiliary stand has been positioned, the jack is lowered to transfer the weight of the car to the auxiliary stand; the jack and the lifting bracket are now removed, and the operator proceeds to change the tire or wheel in the customary manner. After the wheel has been repositioned, the jack and bracket are engaged as heretofore described, and the car is reelevated to take the load off the auxiliary stand, which is then removed. The car is now lowered to the ground and the jack and bracket are disengaged from the wheel.

Although the type of bracket shown in Figures 1 and 2 may be used with wheels of various size hub openings, it may be desirable to have a universal bracket which will fit every type of wheel. To provide such an adjustable bracket, reference may be had to the construction shown in Figure 3. In this construction, the jack engaging foot or bearing portion is indicated at 18. Formed integrally with said bearing portion is a downwardly extending arm 19 terminating in a seat 20 for fulcruming on the flange 5 of the wheel hub 4. Pivotally mounted on the arm 19 is a second arm 21 terminating in a seat 22 for contacting with the wheel hub at a point vertically spaced from the contact of the first-named arm. With this construction, it will be evident that the lifting pressure of the jack 8 will apply pressure having a tendency to straighten out the arms 19 and 21, as each arm will try to fulcrum at its point of contact with the wheel, simultaneously with the tendency of the arms to relatively move at their hinged or pivotal point 23. To obviate the necessity of manually holding the device in place until the jack starts to apply its force, the hinge may carry a coiled spring 24 having its ends oppositely pressing against arms 19 and 21 to swing the latter into line with the former, it being obvious that the spring 24 must be sufficiently strong to overcome the weight of the tool when positioned on a wheel. The operation of this modification of lifting bracket is similar in all respects to that heretofore described.

In Figure 5 and 6, the downwardly extending arm 25 of the bracket is rectilinear in cross section, to slidably but non-rotatably receive a loose eye or loop 26 formed on a downwardly extending member 27. The member 27 has its lower end notched and may be received either within the wheel casing 4 or on its flange 5. By sliding the member 27 up and down on the arm 25 this type of bracket may be adjusted to fit a large number of automobile hubs.

From the above description, it will be apparent that while I have described the preferred construction, it is to be understood, that I reserve the right to all changes within the spirit of the invention and without the ambit of the prior art.

I claim:—

1. A bracket for use with lifting jacks comprising a foot portion adapted to rest on the top of a lifting jack, an arm extending from said foot portion and adapted to detachably engage a vehicle wheel, and a second arm pivoted to said first arm and adapted to contact the vehicle wheel at a point spaced from said first named arm.

2. A bracket for use with lifting jacks comprising a foot portion adapted to rest on the top of a lifting jack, a pair of arms bearing a pivotal relation to each other carried by the foot portion, said arms being adapted for detachable engagement with a vehicle wheel at vertically spaced points.

3. A bracket for use with lifting jacks comprising a foot portion adapted to rest on the top of a lifting jack, a pair of arms bearing a pivotal relation to each other carried by the foot portion, said arms being adapted for detachable engagement with a vehicle wheel, one of said arms transmitting a lifting force to the wheel and the other arm resisting the tendency of the first arm to fulcrum on the wheel.

4. A bracket for use with lifting jacks comprising a foot portion adapted to rest on the top of a lifting jack, a pair of arms bearing a pivotal relation to each other carried by the foot portion, one of said arms having a terminal hook for engaging through an opening in the wheel and the other arm an abutment portion to contact the wheel at a point vertically spaced from said hook terminal.

5. A bracket for use with lifting jacks comprising an arm pivoted to a lifting jack and adapted to abut a vehicle wheel, and a second arm pivoted to the first-named arm and terminating in a hook to engage a wheel opening at a point vertically spaced from the point of abutment of the first-named arm.

ROBERT LE ROY SHEETZ.